Sept. 26, 1944.   H. ALEXANDERSON   2,358,845
INTERNAL COMBUSTION ENGINE CONTROL
Filed Nov. 4, 1941   3 Sheets-Sheet 1

DRAIN HOLES

INDEXING
OF INNER LINER DOES NOT
AFFECT OIL HOLE CONNECTIONS
TO SERVO MOTOR.

VIEW OF
INDEXING SLOTS

Inventor
Howard Alexanderson.
By Martin J. Finnegan
Attorney

Inventor
Howard Alexanderson
By Martin J. Finnegan
Attorney

Sept. 26, 1944.  H. ALEXANDERSON  2,358,845
INTERNAL COMBUSTION ENGINE CONTROL
Filed Nov. 4, 1941   3 Sheets-Sheet 3
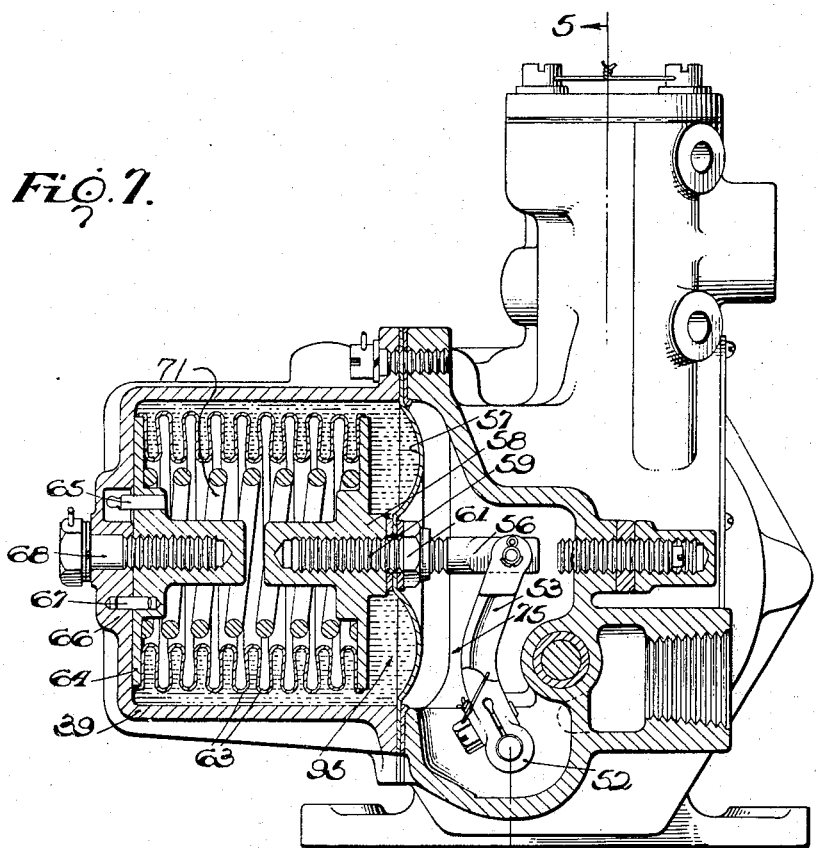
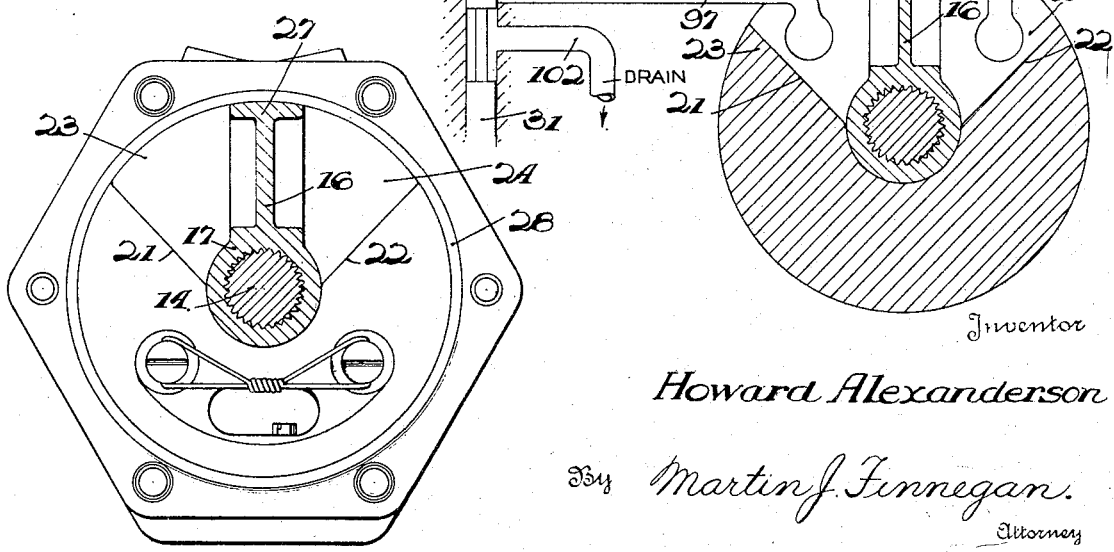
Inventor
Howard Alexanderson
By Martin J. Finnegan.
Attorney Patented Sept. 26, 1944

2,358,845

UNITED STATES PATENT OFFICE 2,358,845

INTERNAL COMBUSTION ENGINE CONTROL

Howard Alexanderson, Wood-Ridge, N. J., assignor to Bendix Aviation Corporation, South Bend, Ind., a corporation of Delaware Application November 4, 1941, Serial No. 417,855

2 Claims. (Cl. 137—156.5)

This invention relates to internal combustion engine operation, and particularly to the control of the position of the throttle governing the supply of combustible mixture to the combustion chambers of the engine.

The object of the invention is to provide improvements in the type of throttle regulator disclosed in Patent No. 2,205,354 to David Gregg et al.

This and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings, wherein like reference numerals refer to like parts throughout the several views, Fig. 1 is a view in elevation of a device embodying the invention;

Figs. 2, 3 and 4 are sectional views of the valve assembly along the lines 2—2, 3—3 and 4—4, respectively, of Fig. 5;

Fig. 7 is a view partly in elevation and partly in section along the line 7—7 of Fig. 5;

Fig. 8 is a transverse view along the line 8—8 of Fig. 5; and

Fig. 9 is a diagram of the fluid connections between the valve assembly and the servo unit.

Figure 1:
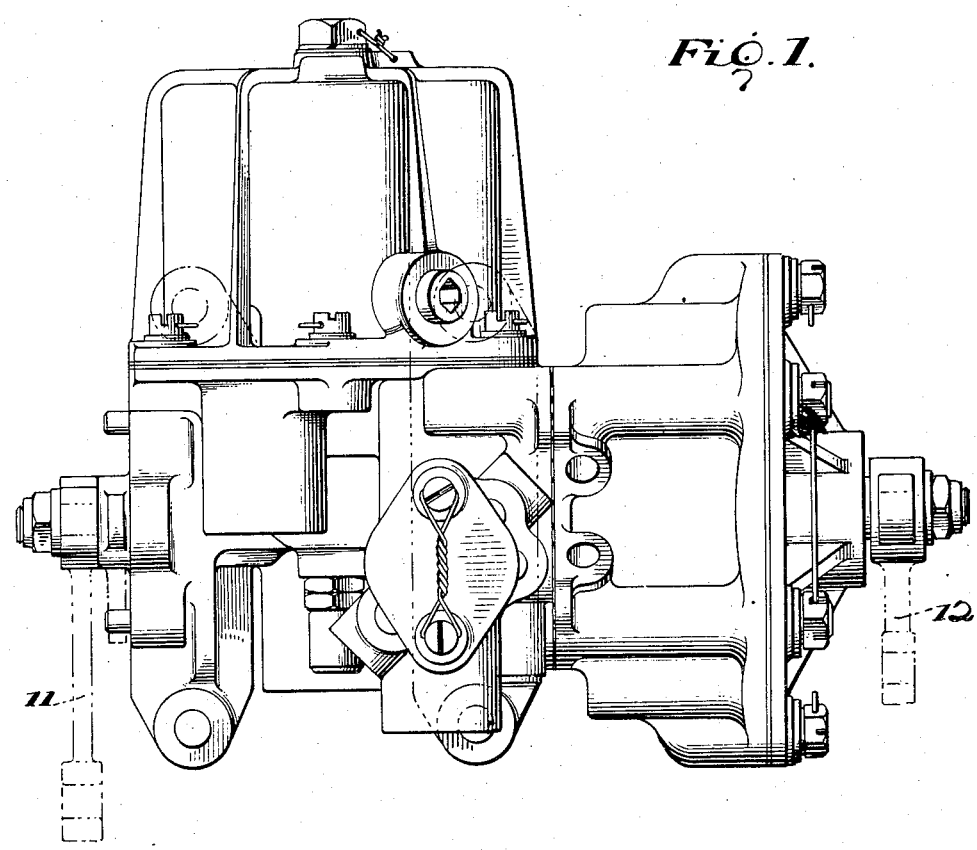
Figure 2:
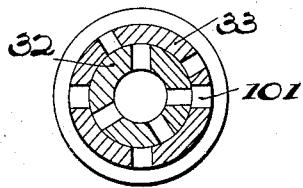
Figure 3:
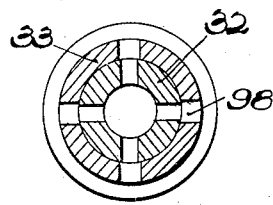
Figure 4:
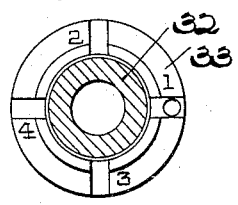
Figure 5:
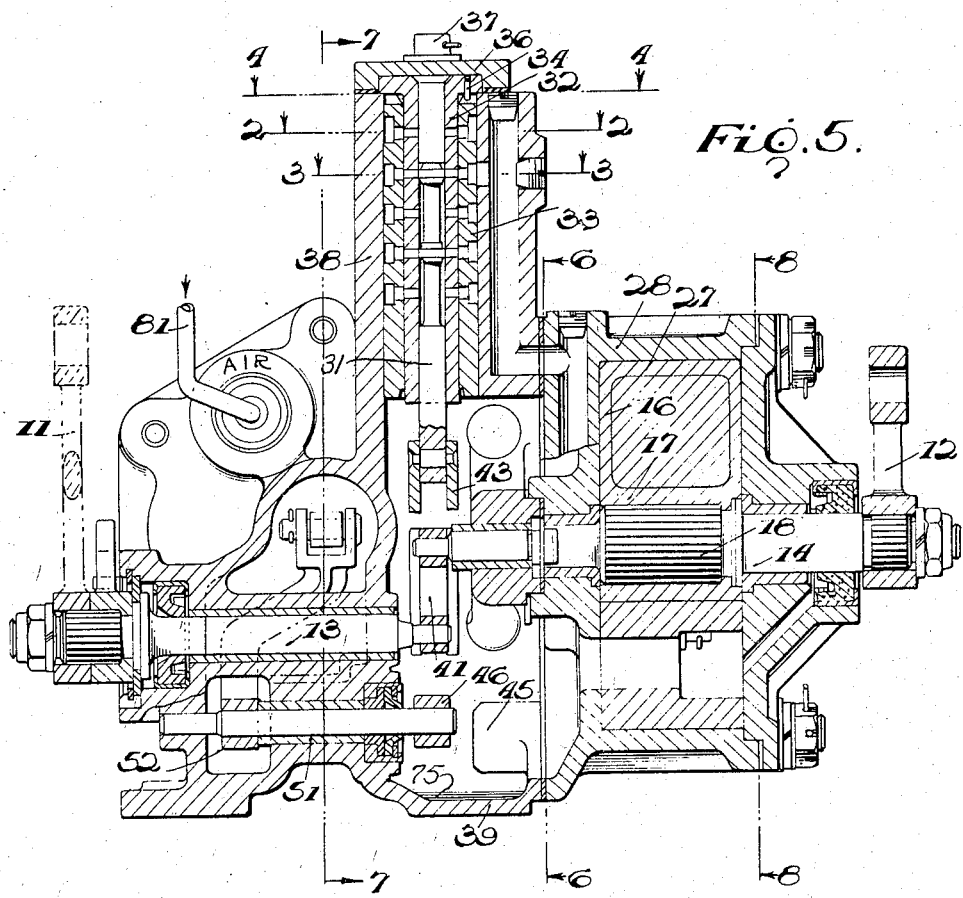
Fig. 5 is a longitudinal sectional view along the line 5—5 of Fig. 7.

Referring first to Figs. 1 and 5, reference characters 11 and 12 designate levers having operative connection with shafts 13 and 14, respectively; the lever 11 being adapted for manual operation in the manner of the linkage 11, 12 of the Gregg et al. patent above referred to, and the lever 12 having operative connection with the throttle, not shown, and therefore corresponding to the member 14 of the said Gregg et al. patent. The shaft 14 (and therefore the lever 12) is adapted to be swung in both directions to produce a corresponding shifting of the throttle in response to manual shifting of the lever 11, and also in response to automatic shifting of a servo element 16 having a hub portion 17 (Figs. 5 and 8) internally splined or serrated to engage corresponding splines or serrations 18 on the central portion of the shaft 14. The servo element 16 is shown in Fig. 8 as in the form of a rockable piston, or vane, movable between two radial abutments 21 and 22 in response to the admission and exhaust of fluid pressure to and from the sector shaped chambers 23 and 24 which are formed by the abutments 21 and 22 on the one hand, and the vanes 16 on the other; the outer portion 27 of the vane being adapted to fit snugly upon the inner cylindrical surface of the housing member 28 for fluid tight engagement therewith.

Figure 6:
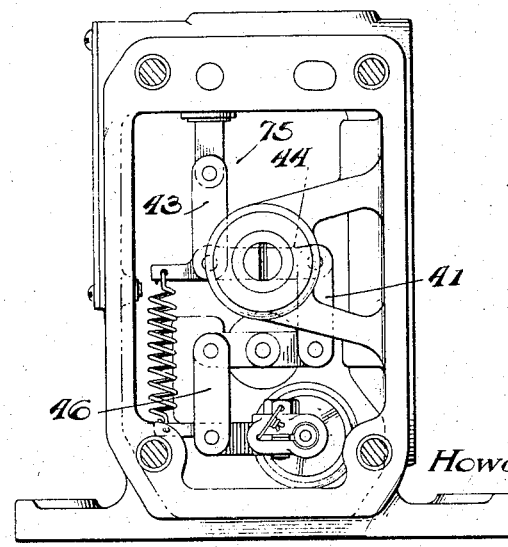
Fig. 6 is a transverse sectional view along the line 6—6 of Fig. 5.

The means for controlling the alternate supply to, and exhaust from, the chambers 23 and 24 is shown as including a valve assembly consisting of a central movable plunger portion 31 (see Fig. 5) an inner valve sleeve 32 and an outer valve sleeve 33; the inner sleeve 32 being rotatable in respect to the other for proper indexing of the ports therein, after which the unit is fixed in the adjusted position by pin 34, cap 36 and the final securing element 37. The valve assembly is housed in the central portion 38 which extends upwardly from the main housing 39 of the device, and is located directly above the linkage 41 connecting the manually operable shaft 13 with the inner reduced end portion 42 of the driven shaft 14. A second linkage 43 (see Figs. 5 and 6) connects with the linkage 41 as indicated at 44 in Fig. 6. Also connecting with the linkage 41 is a third linkage 46 whose lower end link is operatively connected to a rockshaft 49 journaled in a bearing 51 carried by the housing 39 and adapted to receive the lower apertured end portion 52 of a lever 53 which is best shown in Fig. 7. An inner reduced end pin portion of shaft 18 is positioned in eccentric relation to the axis of rotation of the shaft 18. The link 44 is pivotally mounted on the inner pin portion of shaft 18 so that the link 44 will swing in response to rotation of shaft 18—14; but the pin and link 44 are not rigidly fastened, one to the other, as the link 44 can also be swung by movement of the link 41, even though the shaft 18—14 and inner pin portion of shaft 18 are held stationary by the balanced pressures acting upon opposite sides of vane 16. The same is true of the connection between the shaft 13 and the horizontal link extending from link 46 to link 41. The shaft 13 has likewise provided an inner end pin portion positioned in eccentric relation to the axis of rotation of the shaft 13, on which eccentric pin portion the horizontal link extending from link 41 to link 46 is pivotally mounted. Thus, movement may be imparted to the horizontal link connecting links 41 and 46 by movement of the inner eccentric pin portion of shaft 13 and also by independent movement of the links 41 and 46.

The lever 53 has operative pivotal connection with the outer end of a reciprocable element 56 constituting part of the novel diaphragm assembly whose flexible element is shown at 57. The diaphragm assembly also includes a centrally bored and threaded plate 58 with which the corresponding threads 59 of the member 56 have operative engagement. A nut 61 is also threadedly engaged with the member 56 and serves to clamp the flexible diaphragm 57 to the member 58 at the central portion of the diaphragm. Attaching to the plate 58 at its periphery is a flexible corrugated sheet 63 whose opposite end attaches to the periphery of a plate 64 which is secured to the end surface 66 of the housing 39 as indicated at 67 and 68. The member 63 thus constitutes a bellows adapted to be pre-evacuated, and a coiled compression spring 71 is mounted in the bellows to urge the plate 58 (and hence the diaphragm 57) in a rightward direction as viewed in Fig. 7, thereby opposing the collapsing tendency of the evacuated bellows, and holding the latter in equilibrium.

Fluid under pressure is supplied by means of an oil pump (not shown) operated by the engine whose throttle is to be controlled; and from the said pump the oil under pressure is adapted to be supplied to the chambers 23 and 24 of the servo unit under the control of the movable plunger 31 of the valve assembly, which plunger is in turn under the control of the linkage 53, 52, 49, 46, 41 and 43 in the central chamber 75; the said linkage being urged in one direction by the pressure of the spring 71 upon the elements 58 and 57, and in the opposite direction by the pressure of the air that is supplied to the chamber 75 by way of the conduit shown at 81 in Fig. 5, which conduit has connection at its opposite end, (not shown, but see connection 36 in the Gregg et al. patent above referred to) with the intake manifold of the engine whose combustible mixture supply is to be regulated.

A novel feature is the provision of oil or other liquid filling the space between the elements 63 and 58, on the one hand, and the inner surface of the slack diaphragm 57 on the other. This oil constitutes a damping agency as well as constituting the means for transmitting to the bellows 63 the pressure being applied to the diaphragm 57 by the air entering the chamber 75 from the intake manifold by way of conduit 81. In other words, the pressure which opposes the spring 71 (and therefore, in conjunction with said spring constitutes the operating means for the valve shifting linkage 56, 53, etc.) is transmitted by the slack diaphragm 57 directly to the oil in the space 95, and from said oil the pressure is transmitted to the bellows 63. Hence the slack diaphragm 57 is not loaded in any way whatever, and serves merely to retain the oil in the space 95. Thus there is provided a novel method of damping the vibrating tendency (which is characteristic of a bellows of the type indicated at 63) which novel method at the same time serves to segregate the damping liquid from the supply of air which is introduced to the chamber 75 by way of the conduit 81.

Fig. 9 shows diagrammatically the manner in which the shifting of the plunger 31 of the valve assembly operates to supply fluid to one side or the other of the servo-motor 16 of Fig. 8, while at the same time permitting an exhaust of operating fluid from the opposite side thereof; the conduits connecting the valve chamber with the two chambers 23, 24 of the servo unit being indicated at 97 and 98 in Fig. 9, and the supply conduit at 99, while the two exhaust ("drain") passages are indicated at 101 and 102, the former being the exhaust passage when chamber 24 is being evacuated by way of conduit 98, and the passage 102 being the exhaust passage when the chamber 23 is being evacuated by way of conduit 97.

The word "indexing" as used herein means the turning of one of the valve sleeves with respect to the other, to bring about the desired radial alignment of the ports of one with those of the other. Once this "indexing" has been accomplished, there is no further relative rotation between these valve sleeves. That is, the alternate opening and closing of the several ports is accomplished, during operation of the device, by the rectilinear motion of the valve plunger 31, and not by any relative movement of elements 32 and 33.

In operation, the valve plunger will remain in the neutral position so long as the carburetor throttle setting is correct for maintenance of the desired pressure in the intake manifold of the engine, at the engine loading and altitude concurrently prevailing. When engine loading or altitude changes, however, the intake manifold pressure will change correspondingly. If the manifold pressure increases the pressure in chamber 75 will increase correspondingly, as the chamber 75 is connected to the intake manifold by the conduit 81. This pressure increase will cause displacement of the slack diaphragm 57, and the pressure thus exerted upon the interposed liquid 95 will cause a contraction of the bellows 63—the liquid itself being incompressible, of course. The resulting contraction of the bellows 63 (axially) will cause members 58, 56 to shift to the left, and this will cause arm 53 to turn about the pivot 51. This turning will move the linkage 46, 41, 44, 43 and hence the valve plunger 31 will be shifted to a lower position. This shift of the valve plunger will establish two parallel paths of flow; one path being from servo-motor chamber 24 to the outlet 101 (Fig. 9) and the other path being from pressure source 99 to the servo-motor chamber 23. The pressure thus exerted on vane 16 of the servo-motor will cause rotation of shaft 18—14 and a corresponding change in throttle setting, to restore intake manifold pressure to the predetermined point. During this rotation of shaft 18—14 the link 44 will swing with the shaft (due to the eccentricity of the inner pin portion of the shaft 18 in relation to the axis of rotation of the shaft 18) and this swinging of the link 44 will restore valve plunger 31 toward the neutral position. Thus equilibrium is restored by the "follow-up" action of shaft 18—14 on link 44.

When manifold pressure drops below the predetermined point, the bellows 63 will expand to shift member 56 to the right, and the linkage will then cause valve plunger 31 to move to a higher position. Again two parallel paths of flow will be established, but this time they will operate to swing vane 16 in the other direction, thus shifting the throttle link 12 oppositely to the direction heretofore referred to. The "follow-up" action will again restore the valve to neutral when manifold pressure has been restored to normal.

Likewise upon manual adjustment of the lever 11 there will be imparted a movement to the eccentric inner pin portion of the shaft 13, which as previously explained will cause the link horizontally connecting the links 46 and 41 to swing in such a manner as to pivot on its connection to the link 46 so as to move the linkages 41, 44, 43 and hence the valve plunger 31 in a direction to affect an adjustment of the throttle setting. The latter movement will also affect an adjustment of the value of the normal manifold pressure setting at which the bellows 57 will adjust the valve plunger 31 to a neutral position by varying the position of the eccentric inner pin portion of the shafts 13 and 18. The follow-up action previously described will again restore the valve plunger 31 to a neutral position upon the manifold pressure attaining the adjusted normal value determined by the adjustment of the lever 11.

What is claimed is:

1. Motion transmitting means comprising a slack diaphragm, a bellows having an end plate to which the central portion of said slack diaphragm is mechanically clamped, so that the said central portion of said slack diaphragm is at all times caused to follow along with the movement of said bellows, and a casing closed at one end by said slack diaphragm, said casing containing said bellows, and also containing a quantity of liquid completely filling the space between said bellows and said slack diaphragm, whereby pressure variations acting upon one side of said slack diaphragm cause movement of the liquid on the opposite side thereof and thus produce a corresponding movement of said bellows.

2. Motion transmitting means comprising a slack diaphragm, a bellows, a casing closed at one end by said slack diaphragm, said casing containing said bellows, and also containing a quantity of liquid completely filling the space between said bellows and said slack diaphragm, whereby pressure variations acting upon one side of said slack diaphragm cause movement of the liquid on the opposite side thereof and thus produce a corresponding movement of said bellows, and means for mechanically clamping the central portion of said slack diaphragm to said bellows, so that the said central portion of said slack diaphragm is at all times caused to follow along with the movement of said bellows.

HOWARD ALEXANDERSON.